United States Patent

Iwase (10) Patent No.: US 10,422,987 B2
(45) Date of Patent: Sep. 24, 2019

(54) IMAGE ACQUISITION DEVICE AND IMAGE ACQUISITION METHOD FOR IMAGE ACQUISITION DEVICE

(71) Applicant: HAMAMATSU PHOTONICS K.K., Hamamatsu-shi, Shizuoka (JP)

(72) Inventor: Fumio Iwase, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

(21) Appl. No.: 15/030,198

(22) PCT Filed: Jan. 28, 2014

(86) PCT No.: PCT/JP2014/051805
§ 371 (c)(1),
(2) Date: Apr. 18, 2016

(87) PCT Pub. No.: WO2015/064117
PCT Pub. Date: May 7, 2015

(65) Prior Publication Data
US 2016/0252717 A1    Sep. 1, 2016

(30) Foreign Application Priority Data

Nov. 1, 2013 (JP) ................................. 2013-228606

(51) Int. Cl.
*H04N 5/00* (2011.01)
*G02B 21/36* (2006.01)
(Continued)

(52) U.S. Cl.
CPC ............ *G02B 21/367* (2013.01); *G02B 21/06* (2013.01); *G02B 21/241* (2013.01); *G06T 5/002* (2013.01);
(Continued)

(58) Field of Classification Search
CPC ... G09B 9/00; H04N 7/18; H04N 5/00; G02B 21/00; G02B 21/36; G01B 11/24; G06T 7/00; G06T 5/50
See application file for complete search history.

(56) References Cited

U.S. PATENT DOCUMENTS

2003/0063851 A1* 4/2003 Hillendahl ........... G01N 21/253
385/31
2003/0136980 A1* 7/2003 Lin .................. H01L 27/14625
257/215
(Continued)

FOREIGN PATENT DOCUMENTS

CN     102854615     1/2013
EP     1 439 385     7/2004
(Continued)

OTHER PUBLICATIONS

International Preliminary Report on Patentability dated May 3, 2016 for PCT/JP2014/051805.

*Primary Examiner* — Maryam A Nasri
(74) *Attorney, Agent, or Firm* — Drinker Biddle & Reath LLP (57) ABSTRACT

In an image acquisition device, imaging is performed using an imaging element capable of rolling reading an optical image of a sample irradiated with instantaneous light. Therefore, the image can be captured with a sufficient S/N ratio even when the optical image is weak. Further, the image acquisition device includes a light source control unit that causes the instantaneous light to be emitted from a light source from the start of exposure of a pixel row of which reading last starts to the start of reading of a pixel row of which the reading first starts. That is, in the image acquisition device, the light source control unit causes the sample to be irradiated with the instantaneous light from the light emitting means during a period of time in which all pixel rows of the imaging element are exposed.

6 Claims, 6 Drawing Sheets

(51) Int. Cl.
    *H04N 5/232*    (2006.01)
    *G02B 21/06*    (2006.01)
    *G02B 21/24*    (2006.01)
    *G06T 5/00*     (2006.01)
    *G02B 21/08*    (2006.01)

(52) U.S. Cl.
    CPC ....... *H04N 5/2329* (2013.01); *H04N 5/23212* (2013.01); *G02B 21/086* (2013.01)

(56) References Cited

U.S. PATENT DOCUMENTS

| | | | | |
|---|---|---|---|---|
| 2007/0206097 | A1* | 9/2007 | Uchiyama | G02B 21/367 348/207.99 |
| 2007/0223802 | A1* | 9/2007 | Tateda | B29C 70/54 382/141 |
| 2007/0230939 | A1 | 10/2007 | Tanaka et al. | |
| 2010/0067780 | A1* | 3/2010 | Kawaragi | B81C 99/005 382/149 |
| 2012/0147224 | A1 | 6/2012 | Takayama | |
| 2013/0088634 | A1 | 4/2013 | Kishima et al. | |

FOREIGN PATENT DOCUMENTS

| | | |
|---|---|---|
| JP | S63-191063 A | 8/1988 |
| JP | 2000-501844 | 2/2000 |
| JP | 2003-043363 A | 2/2003 |
| JP | 2003-222801 A | 8/2003 |
| JP | 2003-270545 | 9/2003 |
| JP | 2007-263868 | 10/2007 |
| JP | 2008-507719 | 3/2008 |
| JP | 2012-108184 A | 6/2012 |
| JP | 2012-138068 A | 7/2012 |
| JP | 2015-536482 | 12/2015 |
| WO | WO-2006/098443 A1 | 9/2006 |

\* cited by examiner

IMAGE ACQUISITION DEVICE AND IMAGE ACQUISITION METHOD FOR IMAGE ACQUISITION DEVICE

TECHNICAL FIELD

The present invention relates to an image acquisition device and an image acquisition method for an image acquisition device.

BACKGROUND ART

In an image acquisition device for acquiring still images of a sample such as tissue cells, when the sample is larger than an imaging field of view of an imaging element, for example, partial images of the sample are sequentially acquired while moving the sample relative to the objective lens, and then, the partial images are combined so as to acquire an image of the entire sample (see, for example, Patent Literature 1 to Patent Literature 3).

CITATION LIST

Patent Literature

[Patent Literature 1] Japanese Unexamined Patent Publication No. 2003-222801
[Patent Literature 2] Japanese Unexamined Patent Publication No. 2000-501844
[Patent Literature 3] Japanese Unexamined Patent Publication No. S63-191063

SUMMARY OF INVENTION

Technical Problem

Imaging methods for the image acquisition device as described above include a method in which global reading in which exposure and reading are performed at the same time in all pixels in an imaging element is used, and a method in which rolling reading in which reading is performed sequentially in each pixel row in an imaging element is used. Among these methods, the method in which the rolling reading advantageous for improvement of an S/N ratio is used has been studied. However, in this method, an optical image of a sample is received at different timing in each pixel row. Accordingly, when a moving sample is imaged, an obtained still image may be distorted.

The present invention has been made to solve the above problem, and an object thereof is to provide an image acquisition device and an image acquisition method for an image acquisition device capable of acquiring a still image of which the distortion is suppressed with respect to a moving sample with a sufficient S/N ratio.

Solution to Problem

In order to solve the above problem, an image acquisition device according to the present invention includes a stage on which a sample is placed; a light emitting means for emitting instantaneous light; a light guiding optical system including an objective lens arranged to face the sample on the stage; a driving unit for moving a focal position of the objective lens relative to the sample in an optical axis direction of the objective lens; an imaging element for capturing an optical image of the sample guided by the light guiding optical system; an image processing unit for processing an image data output from the imaging element; and a control unit for controlling the light emitting means, wherein the imaging element is a two-dimensional imaging element including a plurality of pixel rows and is capable of rolling reading, the control unit causes the instantaneous light to be emitted from the light emitting means during a period of time from the start of exposure of the pixel row of which the reading last starts in the rolling reading to the start of the reading of the pixel row of which the reading first starts, and the image processing unit sequentially acquires image data from the imaging element, and combines the acquired image data to form combined image data.

In the image acquisition device, an optical image of the sample irradiated with the instantaneous light is captured using the two-dimensional imaging element capable of rolling reading. Therefore, noise in the imaging element can be reduced and the image can be captured with a sufficient S/N ratio even when the optical image is weak. Further, this image acquisition device includes the control unit that causes the instantaneous light to be emitted from the light emitting means from the start of exposure of the pixel row of which reading last starts in the rolling reading to the start of reading of the pixel row of which the reading first starts. That is, in this image acquisition device, the control unit causes the sample to be irradiated with the instantaneous light from the light emitting means during a period of time in which all of the pixel rows of the imaging element capable of rolling reading are exposed. Accordingly, since an optical image of the sample is received in the respective pixel rows at the same timing, it is possible to acquire a still image of which the distortion is suppressed.

It is preferable that the imaging element outputs a trigger signal indicating the start of exposure of the pixel row of which the reading last starts in the rolling reading to the control unit, and the control unit starts the irradiation of the instantaneous light based on the trigger signal output from the imaging element. In this case, it is possible to cause the sample to be irradiated with the instantaneous light more reliably during a period of time in which all of the pixel rows are exposed.

It is preferable for the control unit to control the light emitting means so that there is a predetermined period of time from the end of the irradiation of the instantaneous light to the start of the reading of the pixel row of which the reading first starts in the rolling reading. Accordingly, even when there is delayed light arriving at the imaging element with a delay after the end of the irradiation of the instantaneous light, the delayed light is received during the predetermined period of time. Accordingly, the optical image of the sample can be received in all of the pixel rows under the same conditions.

It is preferable for the control unit to control the light emitting means so that there is a predetermined period of time from the start of exposure of the pixel row of which the reading last starts in the rolling reading to the start of the irradiation of the instantaneous light. In this case, it is possible to cause the sample to be irradiated with the instantaneous light more reliably during a period of time in which all of the pixel rows are exposed.

It is preferable for the driving unit to move a focal position of the objective lens to a focusing position during a period of time from the start of reading of the pixel row of which the reading first starts in the rolling reading to the start of exposure of the pixel row of which the reading last starts. In this case, since focusing of the objective lens can be performed using a period of time in which each pixel row does not capture the optical image of the sample, faster acquisition of still images can be realized.

It is preferable for the driving unit to move the focal position of the objective lens so that there is a predetermined period of time from the end of the movement of the focal position of the objective lens to the start of exposure of the pixel row of which the reading last starts in the rolling reading. In this case, it is possible to reduce an influence of vibration due to driving of the objective lens or the stage when the image data is acquired.

An acquisition method for an image acquisition device according to the present invention is an image acquisition method for an image acquisition device including a stage on which a sample is placed; a light emitting means for emitting instantaneous light; a light guiding optical system including an objective lens arranged to face the sample on the stage; a driving unit for moving a focal position of the objective lens relative to the sample in an optical axis direction of the objective lens; an imaging element for capturing an optical image of the sample guided by the light guiding optical system; an image processing unit for processing an image data output from the imaging element; and a control unit for controlling the light emitting means, the image acquisition method including: using, as the imaging element, a two-dimensional imaging element including a plurality of pixel rows and is capable of rolling reading; causing, by the control unit, the instantaneous light to be emitted from the light emitting means during a period of time from the start of exposure of the pixel row of which the reading last starts in the rolling reading to the start of the reading of which the pixel row of which the reading first starts; and sequentially acquiring, by the image processing unit, image data from the imaging element, and combining the acquired image data to form combined image data.

In this image acquisition method for an image acquisition device, an optical image of the sample irradiated with the instantaneous light is captured using the two-dimensional imaging element capable of rolling reading. Therefore, noise in the imaging element can be reduced and the image can be captured with a sufficient S/N ratio even when the optical image is weak. Further, in this image acquisition method for an image acquisition device, instantaneous light is caused to be emitted from the light emitting means by the control unit from the start of exposure of the pixel row of which reading last starts in the rolling reading to the start of reading of the pixel row of which the reading first starts. That is, in this image acquisition method for an image acquisition device, the sample is caused to be irradiated with the instantaneous light from the light emitting means by the control unit during a period of time in which all of the pixel rows of the imaging element capable of rolling reading are exposed. Accordingly, since an optical image of the sample is received in the respective pixel rows at the same timing, it is possible to acquire a still image of which the distortion is suppressed.

Advantageous Effects of Invention

According to the present invention, it is possible to acquire a still image of which the distortion is suppressed with respect to a moving sample with a sufficient S/N ratio.

BRIEF DESCRIPTION OF DRAWINGS

FIGS. 2A and 2B are diagrams illustrating an example of an imaging element, where FIG. 2A illustrates a light reception surface of the imaging element, and FIG. 2B illustrates a relationship between rolling reading in the imaging element and, for example, irradiation of instantaneous light.

FIGS. 5A and 5B are diagrams illustrating an imaging element according to a modification example, where FIG. 5A illustrates a light reception surface of the imaging element, and FIG. 5B illustrates a relationship between rolling reading in the imaging element and irradiation of instantaneous light.

FIGS. 6A and 6B are diagrams illustrating an imaging element according to another modification example, where FIG. 6A illustrates a light reception surface of the imaging element, and FIG. 6B illustrates a relationship between rolling reading in the imaging element and irradiation of instantaneous light.

DESCRIPTION OF EMBODIMENTS

Hereinafter, preferred embodiments of an image acquisition device according to the present invention will be described in detail with reference to the accompanying drawings.

Figure 1:
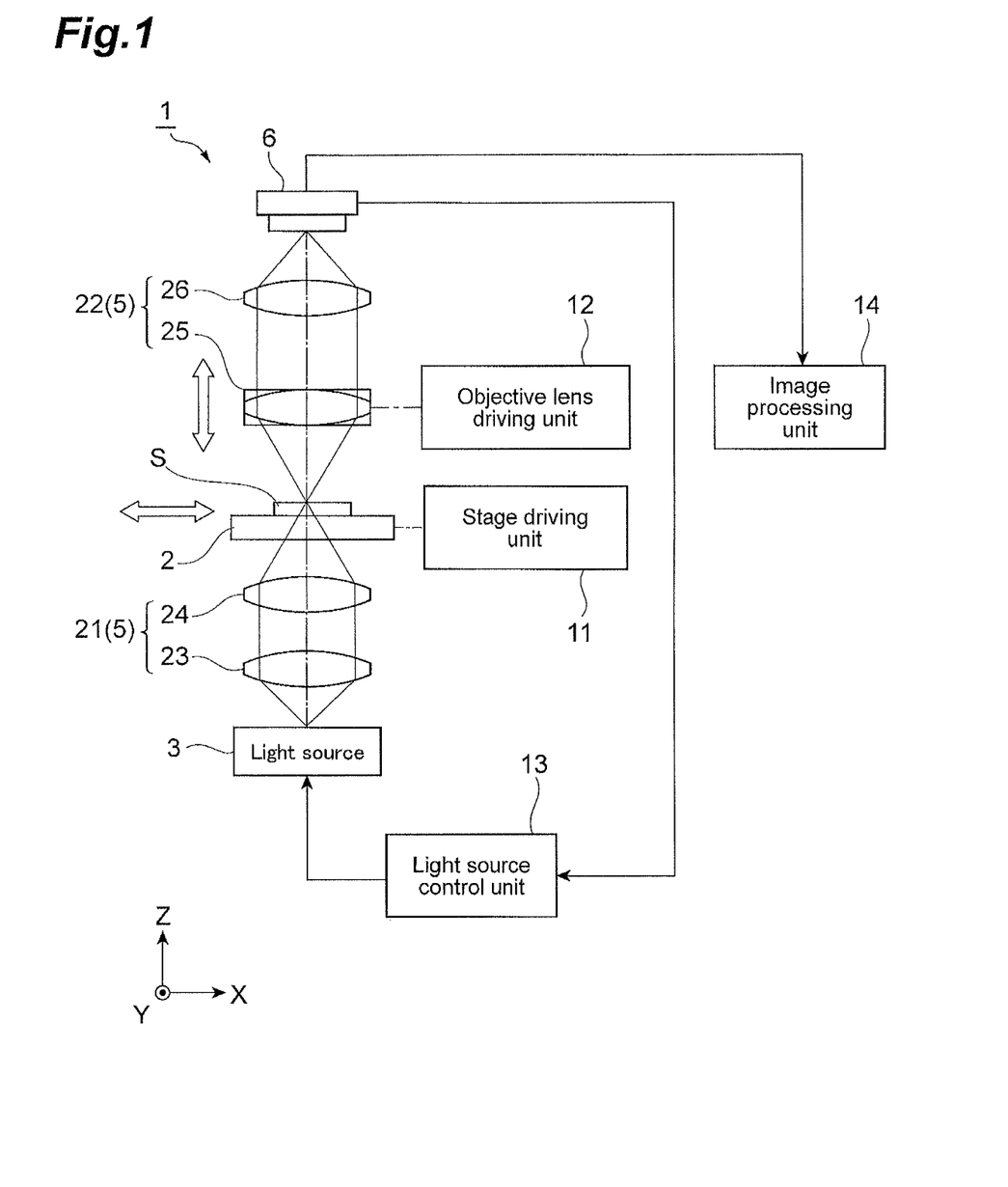
FIG. 1 is a diagram illustrating an embodiment of an image acquisition device according to the present invention.

FIG. 1 is a diagram illustrating an embodiment of an image acquisition device according to the present invention. As illustrated in FIG. 1, an image acquisition device 1 includes a stage 2 on which a sample S is placed, a light source 3 (light emitting means) that irradiates the sample with instantaneous light, a light guiding optical system 5 including an objective lens 25 arranged to face the sample S on the stage 2, and an imaging element 6 that captures an optical image of the sample S guided by the light guiding optical system 5.

Further, the image acquisition device 1 includes a stage driving unit 11 that moves a position of a field of view of the objective lens 25 relative to the sample S, an objective lens driving unit 12 (driving unit) that changes a focal position of the objective lens 25 relative to the sample S, a light source control unit 13 (control unit) that controls the light source 3, and an image processing unit 14.

The sample S observed by the image acquisition device 1 is, for example, a biological sample, such as tissue cells, and is placed on the stage 2 in a state in which the sample S is sealed in a glass slide. The light source 3 is arranged on the bottom side of the stage 2. For example, a laser diode (LD), a light emitting diode (LED), a super luminescent diode (SLD), a flash lamp light source such as a xenon flash lamp, or the like is used as the light source 3.

The light guiding optical system 5 includes an illumination optical system 21 arranged between the light source 3 and the stage 2, and a microscope optical system 22 arranged between the stage 2 and the imaging element 6. The illumination optical system 21 includes, for example, a Koehler illumination optical system including a condenser lens 23 and a projection lens 24, and guides light from the light source 3 and irradiates the sample S with uniform light.

Meanwhile, the microscope optical system 22 includes the objective lens 25, and an image forming lens 26 arranged on the downstream side (imaging element 6 side) of the objective lens 25, and guides an optical image of the sample S to the imaging element 6. The optical image of the sample S is an image formed by transmitted light in the case of bright field illumination, scattered light in the case of dark field illumination, or emitted light (fluorescence) in the case of emitted light measurement. Further, the optical image of the sample S may also be an image formed by reflected light from the sample S. In these cases, an optical system corresponding to image acquisition of the transmitted optical image, the scattered optical image, and the emitted light (fluorescence) image of the sample S can be adopted as the light guiding optical system 5.

Figure 2:
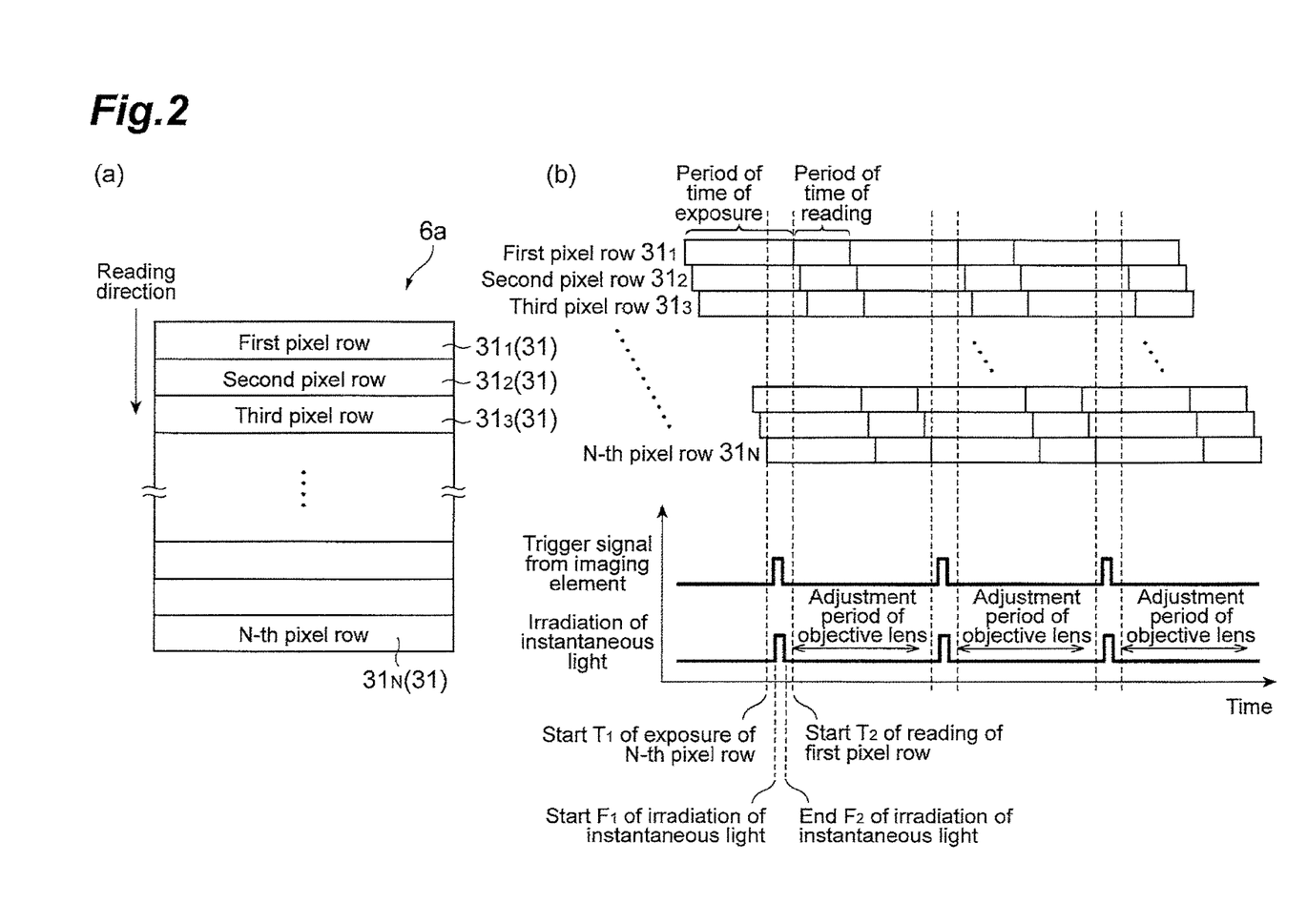

The imaging element 6 is a two-dimensional imaging element that has a plurality of pixel rows and is capable of rolling reading. Such an imaging element 6 may include, for example, a CMOS image sensor. A plurality of pixel rows 31 (a first pixel row $31_1$, a second pixel row $31_2$, a third pixel row $31_3$, . . . , an N-th pixel row $31_N$) in which a plurality of pixels are arranged in a direction perpendicular to a reading direction are arranged in the reading direction on a light reception surface 6a of the imaging element 6, as illustrated in FIG. 2A. Since sequential exposure and reading are performed in each pixel row of the imaging element 6, for example, as illustrated in FIG. 2B, a period of time of exposure and a period of time of reading in each pixel row are different.

The stage driving unit 11 includes, for example, a motor such as a stepping motor (pulse motor) or an actuator such as a piezoelectric actuator. The stage driving unit 11 drives the stage 2 in an XY direction relative to a surface having a predetermined angle (for example, 90°) with respect to a plane perpendicular to an optical axis of the objective lens 25. Accordingly, the sample S fixed to the stage 2 is moved relative to the optical axis of the objective lens, and a position of the field of view of the objective lens 25 relative to the sample S is moved.

Figure 3:
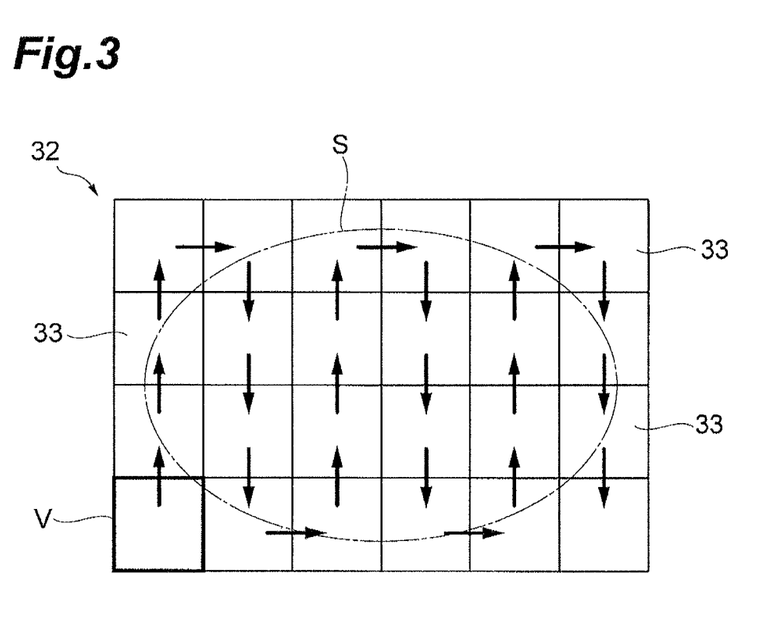
FIG. 3 is a diagram illustrating an example of scan of an image acquisition region for a sample.

In the image acquisition device 1, imaging of the sample S is performed at a high magnification such as 20× or 40×. Therefore, the field of view V of the objective lens 25 is smaller than the sample S and, as illustrated in FIG. 3, a region in which an image can be acquired by onetime imaging becomes smaller than the sample S. Accordingly, in order to image the entire sample S, it is necessary for the field of view V of the objective lens 25 to be moved relative to the sample S.

Therefore, in the image acquisition device 1, an image acquisition region 32 is set to include the sample S with respect to a sample container (for example, a glass slide) holding the sample S, and positions of a plurality of divided regions 33 are set based on the image acquisition region 32 and the field of view V of the objective lens 25 on the sample S. A portion of the sample S corresponding to the divided region 33 is imaged so as to acquire partial image data corresponding to the divided region 33, and then, if the field of view V of the objective lens 25 constitutes a position of the divided region 33 to be next imaged, imaging is performed again to acquire partial image data. In this case, the stage driving unit 11 continues to drive the stage 2 at a constant velocity. Thereafter, in the image acquisition device 1, this operation is repeatedly executed, and the image processing unit 14 combines the acquired partial image data to form the entire image (combined image data) of the sample S.

The objective lens driving unit 12 includes; for example, a motor such as a stepping motor (pulse motor) or an actuator such as a piezoelectric actuator, similar to the stage driving unit 11. The objective lens driving unit 12 drives the objective lens 25 in a Z direction along the optical axis of the objective lens 25. Accordingly, the focal position of the objective lens 25 relative to the sample S is moved.

The light source control unit 13 causes the instantaneous light to be emitted from the light source 3, as illustrated in FIG. 2B. That is, first, the imaging element 6 performs exposure and reading sequentially in order of the first pixel row $31_1$, the second pixel row $31_2$, the third pixel row $31_3$, . . . , the N-th pixel row $31_N$. The imaging element 6 outputs a trigger signal to the light source control unit 13 after the start $T_1$ of exposure of the N-th pixel row $31_N$.

The light source control unit 13 starts irradiation of the instantaneous light from the light source 3 based on the trigger signal output from the imaging element 6. In this case, there is a predetermined period of time ($F_1$-$T_1$) from the start $T_1$ of exposure of the N-th pixel row $31_N$ of which the exposure last starts to the start $F_1$ of irradiation of the instantaneous light. Subsequently, the light source control unit 13 ends the irradiation of the instantaneous light from the light source 3. In this case, there is a predetermined period of time ($T_2$-$F_2$) from the end $F_2$ of the irradiation of the instantaneous light to the start $T_2$ of reading of the first pixel row $31_1$ of which the exposure first starts.

Further, the objective lens driving unit 12 starts driving of the objective lens 25 to the focusing position in the divided region 33 to be imaged next after the start $T_2$ of reading of the first pixel row $31_1$ of which the reading first starts. Then, the objective lens driving unit 12 ends the driving of the objective lens 25. In this case, there is a predetermined period of time from the end of driving of the objective lens 25 to the start of exposure of the N-th pixel row $31_N$ of which the exposure last starts. Here, for the focusing position, for example, a focusing position or a focus map acquired in each divided region 33 prior to imaging of the sample S can be used.

Thereafter, in the image acquisition device 1, an operation thereof is repeatedly performed. When this operation is repeatedly executed, the stage driving unit 11 drives the stage 2, for example, at a speed such that partial image data of the sample S in each divided region 33 can be acquired by the irradiation of each instantaneous light from the light source 3.

As described above, since the imaging element 6 performs the rolling reading, for example, it is possible to reduce noise as compared to global reading and acquire an image with a sufficient S/N ratio even when the optical image of the sample S is weak. Further, since the sample S is irradiated with the instantaneous light from the light source 3 during the period of time in which all of the pixel rows necessary for imaging of the imaging element 6 are exposed, the optical image of the sample S is received in the respective pixel rows at the same timing, and it is possible to acquire a still image of which the distortion is suppressed.

In this case, since the light source control unit 13 starts the irradiation of the instantaneous light from the light source 3 based on the trigger signal from the imaging element 6 and there is the predetermined period of time ($F_1$-$T_1$) from the start $T_1$ of exposure of the N-th pixel row $31_N$ of which the exposure last starts to the start of the irradiation $F_1$ of the instantaneous light from the light source 3, it is possible to irradiate the sample S with the instantaneous light more reliably during the period of time in which all of the pixel rows of the imaging element 6 are exposed.

Further, there is the predetermined period of time ($T_2$-$F_2$) from the end $F_2$ of the irradiation of the instantaneous light to the start $T_2$ of reading of the first pixel row $31_1$ of which the reading first starts. Accordingly, if there is delayed light arriving at the imaging element 6 with a delay after the end of the irradiation of the instantaneous light (for example, the fluorescence of the sample S is acquired), the delayed light is received in the first pixel row $31_1$ during the predetermined period of time ($T_2$-$F_2$). Accordingly, the optical image of the sample S can be received in all of the pixel rows of the imaging element 6 under the same conditions.

Further, since the objective lens driving unit 12 performs focusing of the objective lens 25 using a period of time in which each pixel row does not capture the optical image of the sample S, faster acquisition of still images can be realized. Further, since there is the predetermined period of time from the end of driving of the objective lens 25 to the start of exposure of the N-th pixel row of which the exposure last starts, it is possible to reduce an influence of vibration due to driving of the objective lens 25 when the image data is acquired.

The present invention is not limited to the above embodiment. For example, while the light source control unit 13 starts the irradiation of the instantaneous light from the light source 3 based on the trigger signal output from the imaging element 6 in the above embodiment, the light source control unit 13 may start the irradiation of the instantaneous light from the light source 3 during a period of time from the start of exposure of the N-th pixel row $31_N$ of which the exposure first starts independently of the imaging element 6 to the start of reading of the first pixel row $31_1$ of which the reading first starts. In this case, it is possible to acquire a still image of which the distortion is suppressed.

Further, while the imaging element 6 outputs the trigger signal to the light source control unit 13 after the start $T_1$ of exposure of the N-th pixel row $31_N$ of which the exposure last starts in the above embodiment, the imaging element 6 may output the trigger signal to the light source control unit 13 at the same time as the start $T_1$ of exposure of the N-th pixel row $31_N$ of which the exposure last starts. In this case, the light source control unit 13 starts the irradiation of the instantaneous light from the light source 3 at substantially the same time as the start $T_1$ of exposure of the N-th pixel row $31_N$ of which the exposures last starts based on the trigger signal output from the imaging element 6. In this case, it is possible to irradiate the sample S with the instantaneous light during a period of time in which all of the pixel rows of the imaging element 6 are exposed.

Further, while the light source control unit 13 controls the light source 3 so that there is a predetermined period of time ($T_2$-$F_2$) from the end of irradiation $F_2$ of the instantaneous light to the start $T_2$ of reading of the first pixel row $31_1$ of which the reading first starts in the above embodiment, the light source control unit 13 may end the irradiation of the instantaneous light at the same time as the start $T_2$ of reading of the first pixel row $31_1$ of which the reading first starts. In this case, it is possible to irradiate the sample S with the instantaneous light during a period of time in which all of the pixel rows of the imaging element 6 are exposed.

Further, while the objective lens driving unit 12 drives the objective lens 25 to the focusing position during a period of time from the start of reading of the first pixel row $31_1$ of which the reading first starts to the start of exposure of the N-th pixel row $31_N$ of which the reading last starts in the above embodiment, the objective lens driving unit 12 may drive the objective lens 25 to the focusing position during a period of time other than the above period.

Further, while the objective lens driving unit 12 ends the driving of the objective lens 25 so that there is a predetermined period of time from the end of driving of the objective lens 25 to the start of exposure of the N-th pixel row $31_N$ of which the reading last starts, the driving of the objective lens 25 may end at the same time as the start of exposure of the N-th pixel row $31_N$ of which the reading last starts.

Further, while the instantaneous light is caused to be emitted from the light source 3 in the above embodiment, continuous light (CW light) may be emitted from the light source 3 and a shutter may be provided between the light source 3 and the sample S. In this case, a light emitting means is configured with the light source 3 and the shutter, and the light source control unit 13 controls opening and closing of the shutter. Accordingly, the sample S can be irradiated with the instantaneous light during the period of time in which all of the pixel rows 31 of the imaging element 6 are exposed.

Further, while the focal position of the objective lens 25 relative to the sample S is moved in the optical axis direction of the objective lens 25 by the objective lens driving unit 12 moving the objective lens 25 in the optical axis direction thereof in the above embodiment, the focal position of the objective lens 25 relative to the sample S may be moved in the optical axis direction of the objective lens 25 by the stage driving unit 11 (driving unit) moving the stage 2 in the optical axis direction of the objective lens 25.

Figure 4:
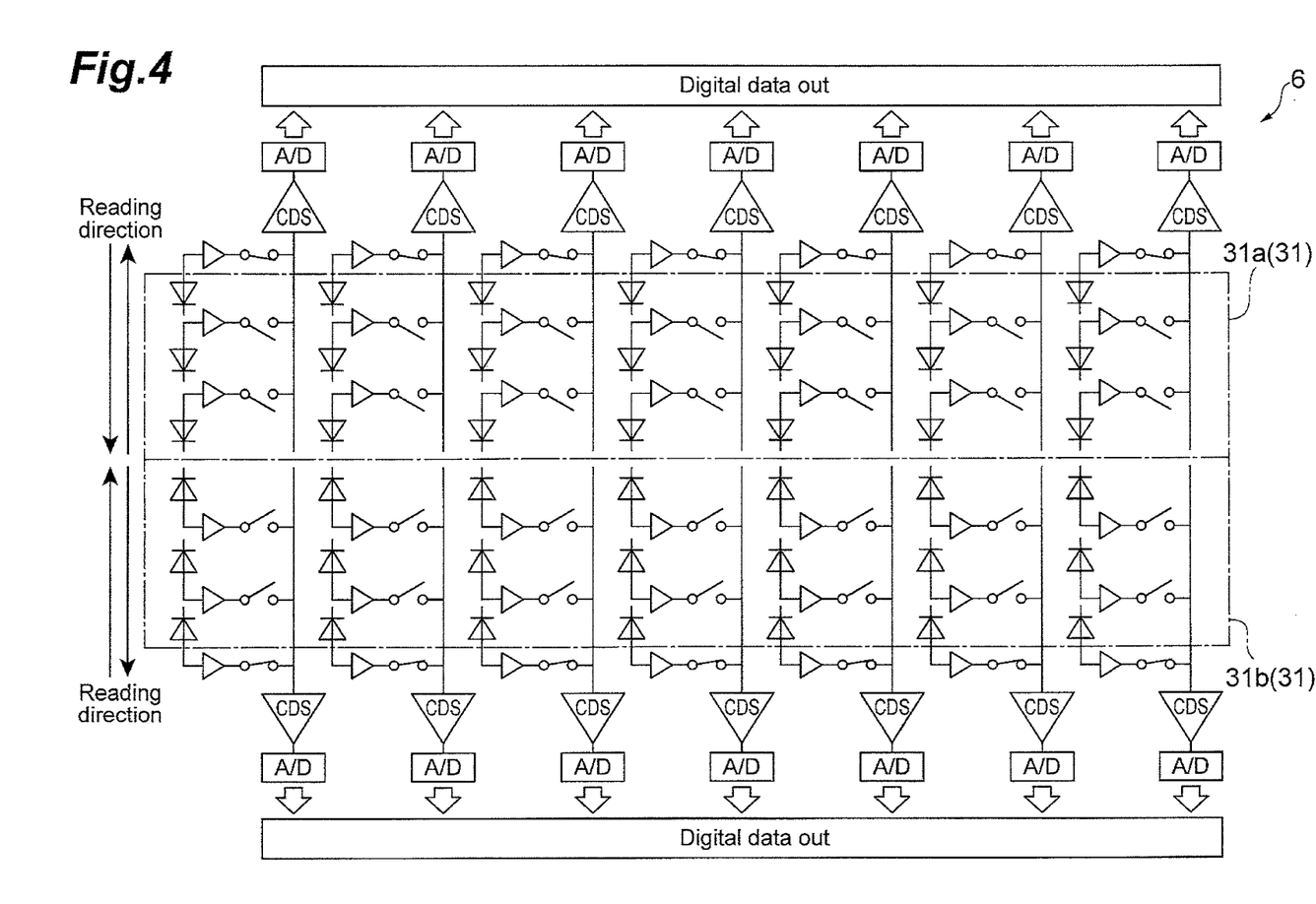
FIG. 4 is a diagram illustrating an example of a configuration of pixel rows in the imaging element.

Further, while the pixel row 31 constituting the light reception surface 6a of the imaging element 6 includes a group of pixel rows such as the first pixel row $31_1$, the second pixel row $31_2$, the third pixel row $31_3$, . . . , the N-th pixel row $31_N$ in the above embodiment, a plurality of pixel rows 31 constituting the light reception surface 6a of the imaging element 6 may be divided into a first pixel row group 31a and a second pixel row group 31b each including a plurality of pixel rows, as illustrated in FIG. 4, and each of the first pixel row group 31a and the second pixel row group 31b may be read.

In this case, a reading direction of the first pixel row group 31a and a reading direction of the second pixel row group 31b may be set to be opposite directions. Specifically, the first pixel row group 31a and the second pixel row group 31b may be read sequentially from the pixel row at a center to the pixel row at an end, or the first pixel row group 31a and the second pixel row group 31b may be read sequentially from the pixel row at the end to the pixel row at the center.

Figure 5:
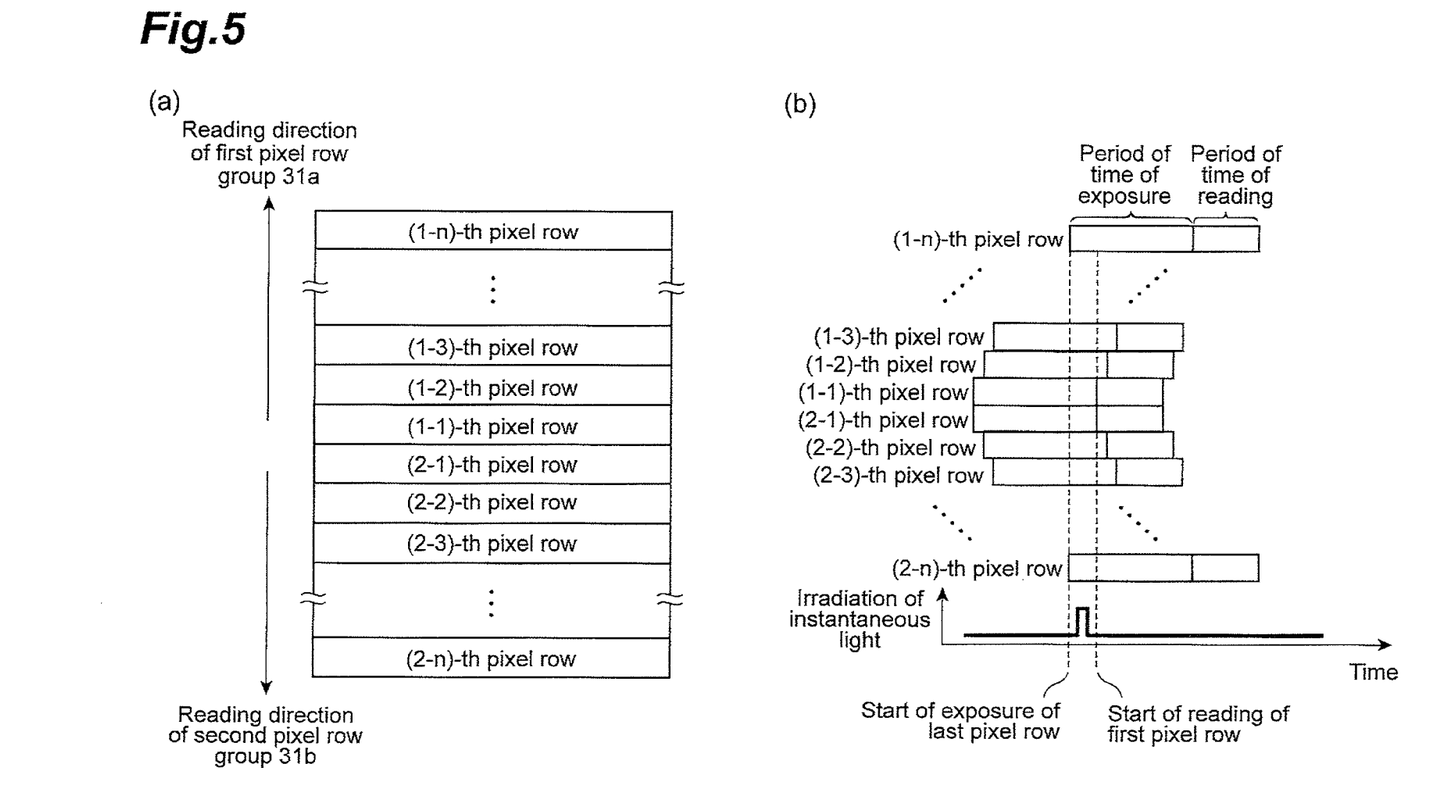
Figure 6:
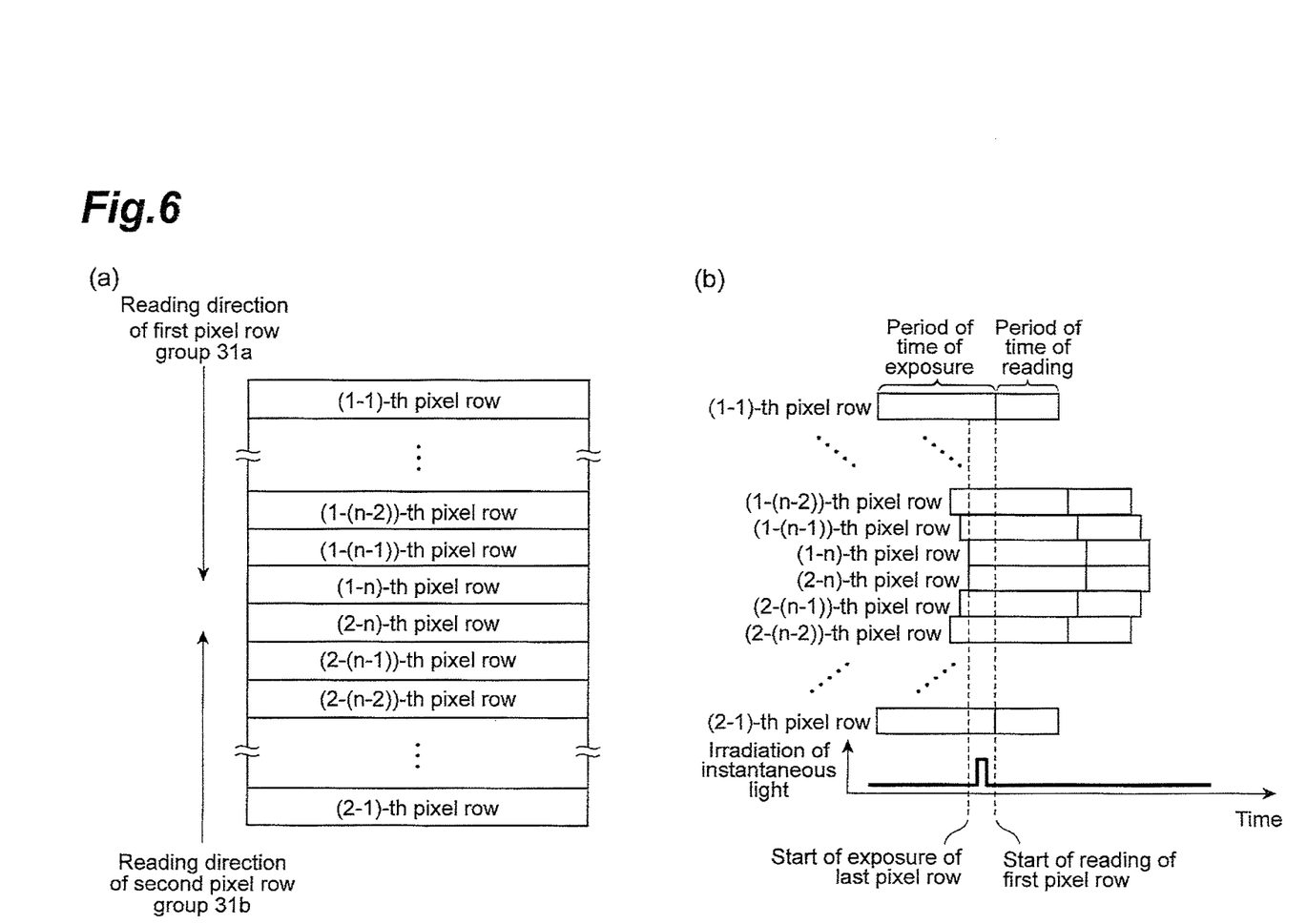

A relationship between a configuration of the light reception surface 6a and the periods of time of exposure and reading in this case is illustrated in FIGS. 5 and 6. As illustrated in FIGS. 5A and 5B, when the first pixel row group 31a and the second pixel row group 31b may be read sequentially from the pixel row at the center to the pixel row at the end, the light source control unit 13 causes the instantaneous light to be emitted from the light source 3 during a period of time from the start of the exposure of the (1-m)-th and (2-m)-th pixel rows that are located at the ends of the light reception surface 6a and of which the exposure last starts to the start of reading of the (1-l)-th and (2-l)-th pixel rows that are located at the center of the light reception surface 6a and of which the reading first starts. On the other hand, as illustrated in FIGS. 6A and 6B, when the first pixel row group 31a and the second pixel row group 31b may be read sequentially from the pixel row at the end to the pixel row at the center, the light source control unit 13 causes the instantaneous light to be emitted from the light source 3 during a period of time from the start of the exposure of the (1-n)-th and (2-n)-th pixel rows that are located at the center of the light reception surface 6a and of which the exposure last starts to the start of reading of the (1-l)-th and (2-l)-th pixel rows that are located at the ends of the light reception surface 6a and of which the reading first starts. In this case, similarly, since the sample S can be irradiated with the instantaneous light during a period of time in which all of the pixel rows of the imaging element 6 are exposed, it is possible to acquire a still image of which the distortion is suppressed.

REFERENCE SIGNS LIST

1: image acquisition device, 2: stage, 3: light source (light emitting means), 5: light guiding optical system, 6: imaging element, 11: stage driving unit (driving unit), 12: objective lens driving unit (driving unit), 13: light source control unit (control unit), 14: image processing unit, 25: objective lens, 31: pixel row, 32: image acquisition region, 33: divided region, S: sample, V: field of view of objective lens.

The invention claimed is:

1. An image acquisition device, comprising:
a stage on which a sample is placed;
a light source configured to emit instantaneous light;
a light guiding optical system including an objective lens arranged to face the sample on the stage;
a driver circuit configured to move a focal position of the objective lens relative to the sample in an optical axis direction of the objective lens;
an imaging sensor configured to capture an optical image of the sample guided by the light guiding optical system;
an image processor configured to process an image data output from the imaging sensor; and
a controller configured to start irradiation of the instantaneous light from the light source based on a trigger signal from the image sensor,
wherein the imaging sensor is a two-dimensional imaging sensor including a plurality of pixel rows and is configured to be capable of rolling reading in a reading direction, the plurality of pixel rows including a plurality of pixels arranged in a direction perpendicular to the reading direction on a light reception surface of the imaging sensor so that sequential exposure and reading are performed in each pixel row of the sensor, the plurality of pixel rows including a first pixel row being rolling read first in the reading direction and a last pixel row being rolling read after the first pixel row, and the last pixel row being rolling read last in the reading direction,
the controller causes the instantaneous light to be emitted from the light source during a period of time when no reading of a pixel row occurs and during a period of time from a start of exposure of the last pixel row of which the reading last starts in the rolling reading to a start of the reading of the first pixel row of which the reading first starts,
the image processor sequentially acquires image data from the imaging sensor, and combines the acquired image data to form combined image data, and
the driver circuit moves a focal position of the objective lens to a focusing position during a period of time from the start of reading of the first pixel row of which the reading first starts in the rolling reading to a start of next exposure of the last pixel row of which the reading last starts.

2. The image acquisition device according to claim 1, the trigger signal indicates the start of exposure of the last pixel row of which the reading last starts in the rolling reading.

3. The image acquisition device according to claim 1, wherein the controller controls the light source so that there is a predetermined period of time from the end of the irradiation of the instantaneous light to the start of the reading of the first pixel row of which the reading first starts in the rolling reading.

4. The image acquisition device according to claim 1, wherein the controller controls the light source so that there is a predetermined period of time from the start of exposure of the last pixel row of which the reading last starts in the rolling reading to the start of the irradiation of the instantaneous light.

5. The image acquisition device according to claim 1, wherein the driver circuit moves the focal position of the objective lens so that there is a predetermined period of time from an end of the movement of the focal position of the objective lens to the start of exposure of the last pixel row of which the reading last starts in the rolling reading.

6. An image acquisition method, comprising:
emitting instantaneous light by a light source,
moving a focal position of an objective lens relative to a sample in an optical axis direction of the objective lens,
capturing, by a two-dimensional imaging sensor including a plurality of pixel rows capable of rolling reading in a reading direction, the plurality of pixel rows including a plurality of pixels arranged in a direction perpendicular to the reading direction on a light reception surface of the imaging sensor so that sequential exposure and reading are performed in each pixel row of the sensor, the plurality of pixel rows including a first pixel row being rolling read first in the reading direction and a last pixel row being rolling read after the first pixel row, and the last pixel row being rolling read last in the reading direction, an optical image of the sample guided by a light guiding optical system including the objective lens arranged to face the sample on a stage,
causing the instantaneous light to be emitted from the light source based on a trigger signal from the image sensor during a period of time when no reading of a pixel row occurs and during a period of time from a start of exposure of the last pixel row of which the reading last starts in the rolling reading to a start of the reading of the first pixel row of which the reading first starts,
sequentially acquiring image data output from the two-dimensional imaging sensor,
combining the acquired image data to form combined image data, and
moving the focal position of the objective lens to a focusing position during a period of time from the start of reading of the first pixel row of which the reading first starts in the rolling reading to a start of next exposure of the last pixel row of which the reading last starts.

* * * * *